(12) United States Patent
DeBry et al.

(10) Patent No.: US 11,996,212 B2
(45) Date of Patent: May 28, 2024

(54) ELECTROPLATING PROCESS FOR CONNECTORIZING SUPERCONDUCTING CABLES

(71) Applicant: Ohio State Innovation Foundation, Columbus, OH (US)

(72) Inventors: Kyle DeBry, Columbus, OH (US); Gregory Lafyatis, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 68 days.

(21) Appl. No.: 17/699,658

(22) Filed: Mar. 21, 2022

(65) Prior Publication Data

US 2022/0270787 A1    Aug. 25, 2022

Related U.S. Application Data

(63) Continuation of application No. 16/298,509, filed on Mar. 11, 2019, now Pat. No. 11,282,620.

(60) Provisional application No. 62/640,739, filed on Mar. 9, 2018.

(51) Int. Cl.
| | |
|---|---|
| *H01B 13/22* | (2006.01) |
| *H01B 12/06* | (2006.01) |
| *H01R 24/40* | (2011.01) |
| *H01R 43/02* | (2006.01) |
| *H02G 15/34* | (2006.01) |

(52) U.S. Cl.
CPC .......... *H01B 13/222* (2013.01); *H01B 12/06* (2013.01); *H01R 24/40* (2013.01); *H02G 15/34* (2013.01); *H01R 43/02* (2013.01)

(58) Field of Classification Search
CPC ...... H01B 13/222; H01B 12/06; H02G 15/34; H01R 24/40
See application file for complete search history.

(56) References Cited

U.S. PATENT DOCUMENTS

| | | | | |
|---|---|---|---|---|
| 4,935,109 A | * | 6/1990 | Dugan | C25D 17/008 204/239 |
| 6,199,266 B1 | * | 3/2001 | Meserve | H01B 12/10 29/599 |
| 6,346,181 B1 | * | 2/2002 | Lee | C25D 5/617 205/104 |

(Continued)

FOREIGN PATENT DOCUMENTS

CN    105483795 B    12/2017

OTHER PUBLICATIONS

Kesgin et.al., Fully filamentized HTS coated conductor via striation and selective electroplating, Physica C, 486, 2013, pp. 43-50 (Year: 2013).*

*Primary Examiner* — Jeffrey T Carley
*Assistant Examiner* — Jose K Abraham
(74) *Attorney, Agent, or Firm* — Meunier Carlin & Curfman LLC

(57) ABSTRACT

An example method for connectorizing a superconducting cable is described herein. The method can include depositing an oxide layer on a surface of a superconducting cable using a first electrolytic cell, electroplating a metal layer on the surface of the oxide layer of the superconducting cable using a second electrolytic cell, and soldering a connector to the metal layer coated on the surface of the superconducting cable. The oxide layer allows the metal layer to adhere to the surface of the superconducting cable.

16 Claims, 2 Drawing Sheets

(56) References Cited

U.S. PATENT DOCUMENTS

| | | | |
|---|---|---|---|
| 6,951,985 B1 | 10/2005 | Lemelson | |
| 2005/0020452 A1* | 1/2005 | Nakanishi | H01R 4/68 |
| | | | 505/100 |
| 2005/0113258 A1* | 5/2005 | Kai | H01P 1/205 |
| | | | 505/210 |
| 2010/0022396 A1* | 1/2010 | Otto | H02G 15/34 |
| | | | 505/231 |
| 2014/0323314 A1* | 10/2014 | Takemoto | H10N 60/0801 |
| | | | 505/433 |
| 2016/0352027 A1* | 12/2016 | van der Laan | H02G 15/08 |
| 2017/0229224 A1* | 8/2017 | Shen | H01F 1/143 |
| 2019/0172612 A1* | 6/2019 | Ohsugi | C23C 28/00 |
| 2019/0267532 A1* | 8/2019 | David | H01B 12/02 |

\* cited by examiner

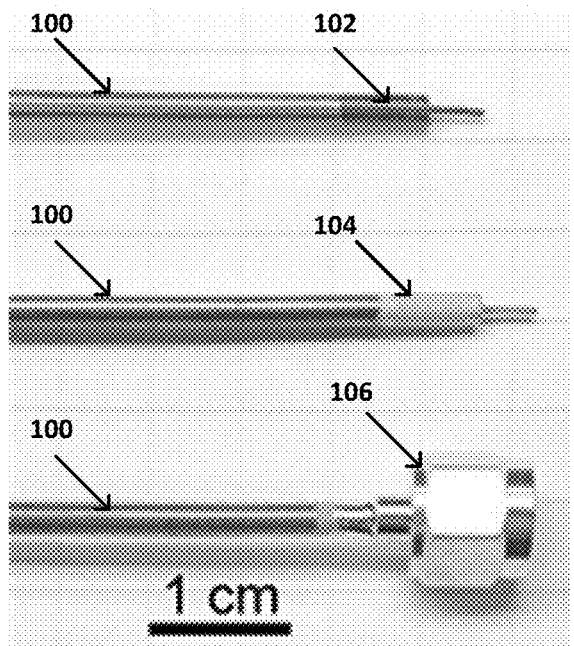
*FIG. 1A*
*FIG. 1B*
*FIG. 1C*
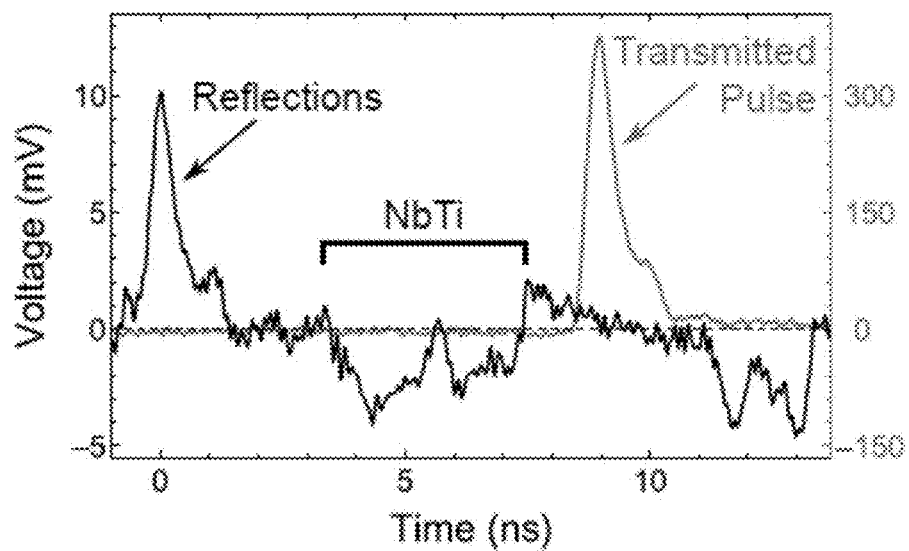
*FIG. 2*

ELECTROPLATING PROCESS FOR CONNECTORIZING SUPERCONDUCTING CABLES

CROSS-REFERENCE TO RELATED APPLICATIONS

This application is a continuation of U.S. patent application Ser. No. 16/298,509, filed on Mar. 11, 2019, which claims the benefit of U.S. provisional patent application No. 62/640,739, filed on Mar. 9, 2018, and entitled "ELECTROPLATING PROCESS FOR CONNECTORIZING SUPERCONDUCTING CABLES," the disclosures of which are expressly incorporated herein by reference in its entire their entireties.

STATEMENT REGARDING GOVERNMENT SUPPORT

This invention was made with government support under grant number N00014-13-1-0627 awarded by the United States Office of Naval Research. The government has certain rights in the invention.

BACKGROUND

For cryogenic science and engineering experiments conducted at temperatures substantially below the temperature of helium liquid transition, 4.2 K, transmitting electrical signals between the cryogenic instrumentation and the supporting room temperature apparatus poses a well known problem: how does one make a good electrical link without introducing excessive heat flux into the cryogenic system? An example of this general problem is an apparatus, designed to cool superconducting nanowire single-photon detectors (SNSPDs) to just below 0.8 K. The commercial closed cycle cold head operating at ~4 K has a substantial cooling power of about 130 mW.[1] Here, the "cooling power" is a measure of the heat load a refrigerating device can tolerate before its operating temperature is substantially increased above its ultimate minimum. On the other hand, the $^4$He cryocooler that lowers the temperature to ~0.8 K is rated for only about 100 µW of cooling power.[2] The problem is even worse for the dilution refrigerator systems used in most cryogenic quantum computing applications for superconducting qubits. For these, the available cooling power scales approximately as the square of the temperature and, for a typical system operating at 10 s of mK, the available cooling power is only a few µW.[3] Additionally, specific heats scale as a power law of the temperature.[4]

Even if the refrigeration system is capable of handling the heat load, an electrical link may also open up a large thermal link, causing a locally significant temperature increase of the components being studied. The core of this relationship between electrical conductors and thermal conductivity is described by the Wiedemann—Franz law for regular metals, which implies that good electrical conductors will necessarily have large electronic thermal conductivity. Estimates show that the metal wires frequently used at higher temperatures will transfer an excessive heat load when bridging the sub-Kelvin and liquid helium—temperature segments.

The solution to this problem is well known: use superconducting conductors, which do not follow the Wiedmann—Franz law. For temperatures well below the superconducting transition, electronic thermal conductivity goes as a power of the temperature and, for very low temperatures, is predicted to fall-off exponentially.[5] Superconducting cables have been developed for this purpose,[6] and coaxial superconducting cables for high-frequency transmission are available commercially.[7] NbTi is the preferred superconductor for these cables because it has a high superconducting transition temperature (for a low temperature superconductor) of ~10 K. However, these cables are mediocre electrical conductors above the superconducting transition, and a conventional metal cable is usually used for the segment of the electrical link going to room temperature.

A remaining difficulty is to develop a process for attaching radio frequency (RF) connectors to a superconducting cable. There are two ways that regular cables are connectorized: mechanically joining (crimping) the connector onto the cable conductors or, alternatively, making solder connections. Unfortunately, conventional crimp-type RF connectors do not allow for good electrical connections to superconducting coaxial cables. Any connection to the cable's shield is especially unreliable. However, special crimp-type connections have been developed in which a series of copper sleeves are mechanically swaged onto the coaxial conductors, and these in turn may be used to attach connectors as for conventional cables.[8] This process, when done properly, allows for reliable connectorizing, but producing and attaching suitable sleeves is a highly specialized activity. As such, cables produced in this manner are expensive and have long lead times. The alternative, directly soldering the coaxial conductors to a connector, fails because the metals used in the cable have an extremely tough oxide layer that is impervious to even the most aggressive fluxes.

SUMMARY

An example method for connectorizing a cable is disclosed herein. The method can include depositing an oxide layer on a surface of a superconducting cable; and depositing a metal layer on the surface of the superconducting cable. The oxide layer allows the metal layer to adhere to the surface of the superconducting cable. The method can also include soldering a connector to the metal layer coated on the surface of the superconducting cable.

In some implementations, the oxide layer can have a thickness greater than or equal to about 10 nm. Optionally, the oxide layer can have a thickness of less than about 35 nm.

Alternatively or additionally, the metal layer can be formed of a non-magnetic metal. For example, the metal layer can be formed of copper, silver, gold, or alloys thereof. Alternatively, the metal layer can be formed of a magnetic metal such as nickel, for example.

Alternatively or additionally, the oxide layer can be deposited on the surface of the superconducting cable using a first electrolytic cell. Additionally, the step of electroplating the metal layer on the surface of the superconducting cable can include depositing the metal layer on the surface of the superconducting cable using a second electrolytic cell.

Alternatively or additionally, the first electrolytic cell can include an oxidizing solution. Optionally, the oxidizing solution can include sodium hydroxide (NaOH) in deionized water.

Alternatively or additionally, the step of depositing an oxide layer on the surface of the superconducting cable can optionally further include placing the surface of the superconducting cable into the first electrolytic cell and applying a first electrical signal to a circuit, which can include a cathode and an anode. The anode is the surface of the superconducting cable. Optionally, the first electrical signal can have a voltage between about 5V and about 15V.

Alternatively or additionally, the metal layer can be formed of copper in some implementations, and the second electrolytic cell can include an acidic copper plating solution. Optionally, the acidic copper plating solution can include copper sulfate pentahydrate (CuSO4·5H2O) with sulfuric acid (H2SO4) in deionized water.

Alternatively or additionally, the step of depositing the metal layer on the surface of the superconducting cable using a second electrolytic cell can include placing the surface of the superconducting cable into the second electrolytic cell; and applying a second electrical signal to a circuit, which can include a cathode and an anode. The cathode is the surface of the superconducting cable. Optionally, the second electrical signal can deliver current per area between about 5 mA/cm2 and about 60 mA/cm2.

Alternatively or additionally, the superconducting cable is made of niobium-titanium (NbTi).

Alternatively or additionally the superconducting cable is made of niobium, titanium, or alloys thereof.

Alternatively or additionally, the connector is a radiofrequency (RF) connector.

A method of electroplating is also described herein. The method can include depositing an oxide layer on a surface of a first metal using a first electrolytic cell; and depositing a layer of a second metal on the surface of the first metal using a second electrolytic cell. The oxide layer allows the layer of the second metal to adhere to the surface of the first metal.

Alternatively or additionally, the first metal oxidizes when exposed to air.

Alternatively or additionally, the first metal is magnesium or aluminum.

Another example method for connectorizing a cable is described herein. The method can include electroplating a layer of metal such as copper on a surface of a superconducting cable, and soldering a connector to the layer of metal coated on the surface of the superconducting cable. For example, the method can include depositing an oxide layer on the surface of the superconducting cable using a first electrolytic cell, and depositing the layer of copper on the surface of the superconducting cable using a second electrolytic cell. The oxide layer allows the layer of copper to adhere to the surface of the superconducting cable.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1A illustrates an oxidized NbTi cable 100. The oxide layer is shown with reference number 102. FIG. 1B illustrates the NbTi cable 100 electroplated with copper 104 that is ready to be connectorized. FIG. 1C illustrates the electroplated NbTi cable 100 with a soldered SMA connector 106.

FIG. 2 is a graph illustrating reflection of an electrical pulse sent through a cryostat containing two sections of electroplated NbTi cable. The transmitted pulse height is 0.38 V.

DETAILED DESCRIPTION

Figure 3:
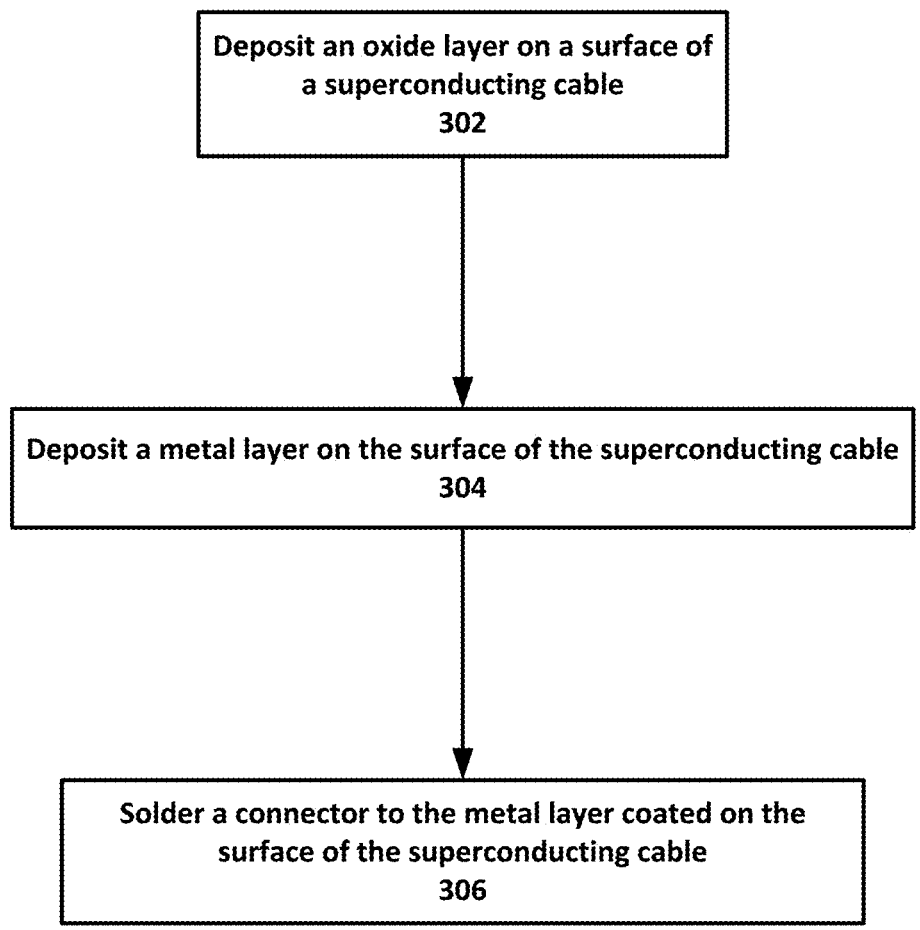
FIG. 3 is a flow chart illustrating the electroplating process for connectorizing superconducting cables according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for connectorizing niobium-titanium (NbTi) superconducting cables, it will become evident to those skilled in the art that the implementations are not limited thereto.

As used herein, the terms "about" or "approximately", when used in reference to a linear dimension (e.g., thickness of an oxide layer) or voltage/current (e.g., voltage or current per area of an electrical signal), mean within plus or minus 10 percent of the referenced parameter.

Experiments done at cryogenic temperatures below the 4.2 K temperature of liquid helium frequently require superconducting coaxial cables to efficiently transmit high-frequency signals while minimizing heat transfer to the experiment's cold stage. These cables are often made of niobium-titanium alloy (NbTi) which is difficult to solder directly. Described herein is an electroplating procedure for plating NbTi coaxial cables directly with copper, which enables connector attachment matching the structural and electrical properties of standard coaxial cables. Here, a cable is first electrochemically coated with a thin oxide layer and then electroplated with copper in an acidic copper sulfate solution. The procedure has modest safety requirements and may be carried out in a standard vented laboratory fume hood.

As described above, attaching radio frequency (RF) connectors to a superconducting cable presents challenges. Conventionally, there are two ways that cables are connectorized: mechanically joining (crimping) the connector onto the cable conductors or, alternatively, making solder connections. An alternative for connectorization is electroplating onto the cable a surface (e.g., a metal layer) that can be soldered. One approach that is used commercially is electroplating nickel onto NbTi cables, using procedures similar to that described in a 1961 patent by Saubestre and Bulan[9] for plating niobium and its alloys. However, this technique has two significant drawbacks. First, nickel is ferromagnetic, which is a potential problem for experiments sensitive to the magnetic environment including some cryogenic qubit proposals. Second, to promote strong adhesion of the nickel plating to the niobium, the Saubestre and Bulan procedure uses a high temperature bake that is well above the 327° C. melting point of polytetrafluoroethylene (PTFE).[10] As PTFE is the dielectric usually used for NbTi cables, this is a fatal drawback for using this as a connectorizing process.

Plating the cables directly with copper, which is only weakly diamagnetic and is readily solderable, is described herein. Existing recipes for electroplating titanium and its alloys with copper use a solution of sodium dichromate ($Na_2Cr_2O_7$) and highly concentrated hydrofluoric acid (HF) .[11] Sodium dichromate is an OSHA-regulated carcinogen, and is not allowed in our local materials science laboratory/ cleanroom facility.[12]

To overcome these obstacles, an electroplating procedure for directly electroplating copper onto NbTi cables has been developed and is described below. It should be understood that copper is only one example material that can be used with the electroplating procedure described herein. This disclosure contemplates using non-magnetic materials including, but not limited to copper, silver, gold, or alloys thereof with the electroplating procedure described below. In embodiments, the electroplating procedure described herein can be used on other oxide producing metals, such as aluminum or magnesium, for example. The electroplating procedure described below uses comparatively safe chemicals and can be carried out in a standard vented laboratory fume hood. Additionally, the electroplating procedure does not require a high temperature bake. It should be understood that NbTi is only one example superconductive material. This disclosure contemplates that the superconducting cables described herein can be other materials including, but not limited to, niobium, titanium, or alloys thereof.

Referring now to FIG. 3, an example method for connectorizing a cable (e.g., the NbTi coaxial cable shown in FIGS. 1A-1C) is disclosed herein. At step 302, the method can include depositing an oxide layer on the surface of a superconducting cable. It should be understood that some metals, including superconductors, oxidize when exposed to air. In conventional process, the oxide layer is removed from the superconducting cable before it is electroplated with copper or nickel. In contrast to such conventional processes, the oxide layer is deposited (e.g., the thickness is increased) at step 302. The oxide layer allows the metal layer, which is deposited at step 304, to adhere to the surface of the superconducting cable. The oxide layer can be deposited to increase its thickness to greater than about 1 nanometer (nm). As described herein, the thickness of the oxide layer can be determined based on the color of the oxide layer. The oxide layer can have a thickness between about 10 nm and about 35 nm. Optionally, the oxide layer has a thickness from about 10 nm to about 15 nm (e.g., gray colored). Optionally, the oxide layer has a thickness from about 15 nm to about 20 nm (e.g., dark gray colored). Optionally, the oxide layer has a thickness from about 20 nm to about 30 nm (e.g., straw colored). Optionally, the oxide layer has a thickness from about 25 nm to about 30 nm (e.g., yellow colored). Optionally, the oxide layer has a thickness from about 30 nm to about 35 nm (e.g., brass colored). In some implementations, the oxide layer can have a thickness less than about 35 nm. An oxide layer with a thickness of less than about 35 nm has been shown to have strong adhesion. The thickness of the oxide layer should be somewhere between yellow (~20 nm) and brown (~35 nm) but not purple (~45 nm). Additionally, the oxide layer can be deposited on the surface of the superconducting cable using a first electrolytic cell as described below.

At step 304, a metal layer is deposited on the surface of the superconducting cable, for example, using a second electrolytic cell as described below. As described herein, the metal layer be a non-magnetic metal such as copper, silver, gold, or alloys thereof. Copper, which is solderable, is the material described in the example below. This disclosure contemplates that the electroplating procedure described herein can be used to deposit metal other than copper. The procedure described herein can therefore use two electrolytic cells. One holds a basic oxidizing solution (e.g., first electrolytic solution used at step 302) and the other holds an acidic copper plating solution (e.g., second electrolytic solution used at step 304) that does the actual plating. Initially, the surface of the NbTi cable is thoroughly cleaned and degreased, for example in an ultrasonic cleaner. Then, at step 302, the first electrolytic cell is used to deposit a special oxide layer on the NbTi cable that will allow the copper to adhere to the titanium. The first electrolytic cell is filled with any alkaline bath—a bath having a pH of at least 7. In embodiments the bath can be made of about 110 g/L of sodium hydroxide (NaOH) in deionized water. The NbTi substrate is connected as the anode in the oxidizing solution with a copper sheet as the cathode with a typical spacing of 5 cm. A first electrical signal is then applied to the circuit. Optionally, the first electrical signal can be a stepped voltage signal, for example, 5 V is applied to this circuit for about 15 seconds and then 10 V for about 30 seconds. Optionally, the first electrical signal can have a voltage from about 5V to about 15V. This stepped up voltage can be applied until the substrate darkens noticeably from the gray of the NbTi to a yellow, tan, or brown color, as shown in FIG. 1A. The oxide layer produces a structural color.[13] A very thin oxide layer of less than about 35 nm leads to the strongest adhesion. It should be understood that chemicals, concentrations, and/or voltages described above are provided only as examples. This disclosure contemplates that other chemicals, concentrations, and/or voltages can be used to deposit the oxide layer using the first electrolytic solution.

After rinsing in deionized water, the NbTi cable can be transferred to the second electrolytic cell to perform step 304. This bath can be an acidic copper plating solution made of 220 g/L of copper sulfate pentahydrate ($CuSO_4 \cdot 5H_2O$) with about 40 mL/L of sulfuric acid ($H_2SO_4$) in deionized water. The NbTi substrate is connected as the cathode with a metal sheet as the anode. In embodiments, the metal sheet can be made of copper. A second electrical signal is applied to the circuit to plate the NbTi cable to achieve the desired thickness of copper (e.g., about 120 seconds) at 0.032 A/cm2, producing the uniform coating of copper shown in FIG. 1B. For the copper electrode, oxygen-free copper can be used to limit impurities and increase the lifetime of the $CuSO_4 \cdot 5H_2O$ solution. In embodiments, the second electrical signal can deliver current per area between about 5 $mA/cm^2$ and about 60 $mA/cm^2$. Optionally, the signal delivers current per area of about 5 $mA/cm^2$. Optionally, the signal delivers current per area of about 5 $mA/cm^2$ to about 10 $mA/cm^2$. Optionally, the signal delivers current per area of about 10 $mA/cm^2$ to about 20 $mA/cm^2$. Optionally, the signal delivers current per area of about 20 $mA/cm^2$ to about 30 $mA/cm^2$. Optionally, the signal delivers current per area of about 30 $mA/cm^2$ to about 40 $mA/cm^2$. Optionally, the signal delivers current per area of about 40 $mA/cm^2$ to about 50 $mA/cm^2$. Optionally, the signal delivers current per area of about 50 $mA/cm^2$ to about 60 $mA/cm^2$. The current per area can be varied depending on the materials and/or different shapes of the object being plated. It should be understood that chemicals, concentrations, and/or currents per are described above are provided only as examples. This disclosure contemplates that other chemicals, concentrations, and/or voltages can be used to deposit the oxide layer using the first electrolytic solution.

As noted above, this disclosure contemplate plating the NbTi cable with other non-magnetic metal such as silver or gold. Alternatively, in embodiments, nickel can be used as a plating metal. Where nickel is used as a plating metal, this disclosure contemplates that step 302 is performed as described above. At step 304, however, the second electrolytic cell can be filled with a standard nickel-plating solution (as opposed to a copper plating solution). An example nickel plating solution is a mixture of NiCl2 and HCl and water, for example, as described in U.S. Pat. No. 2,999,799. According to the process described in U.S. Pat. No. 2,999,799, a baking step is incorporated in an electroplating process, after an object is electroplated. But, such a baking step is accomplished at a temperature which would melt an insulator material found inside many superconducting cables, making such a process unideal for electroplating cables. The electroplating procedure described herein can be accomplished with no baking step, and as such, preserves the insulator inside the NbTi cable. For large or continuous operations, the plating solution can be continuously filtered and regularly replaced.

It should be understood that steps 302 and 304 of the procedure described herein require only standard chemical safety procedures and protective equipment including gloves, a lab coat, and chemical safety goggles. All steps can be performed in a standard laboratory fume hood. Neoprene gloves should be worn when handling concentrated H2SO4 and NaOH.

At step 306, a connector (e.g., SubMiniature version A (SMA) type connectors) can then be attached to the NbTi cable. Optionally, the connector can be an RF connector. The connector can be soldered to the copper (e.g., metal layer) deposited at step 304. This step is the same as if the NbTi cable was a standard coaxial cable. A cable with an SMA connector attached is shown in FIG. 10. It should be understood that SMA type connectors are provided only as an example and that other types of RF connectors can be used.

After producing connectorized superconducting cables using the process described above with regard to FIG. 3, the cables were tested for thermal cycling by thermally shocking them in liquid nitrogen and warming them to room temperature. This cycle was repeated twenty times over the course of about ten minutes. After cycling, the cables were tested for structural integrity and electrical conductivity. None of the connectorized cables tested to date have failed.

"Pull tests" were also performed to characterize the mechanical integrity of the connector—cable junction. Retention force tests were also carried out on four cables by pulling on the SMA connector in a controlled, measured fashion until the connector broke free from the cable.14 Following the military's specifications for the regular room temperature version of these particular RF cables (MIL-PRF-39012E15), the cable—connector junction was found to withstand 60 pounds of axial force. In the four tests carried out, the junctions failed at 61, 61, 67, and 69 pounds of force. Thus, these cables are mechanically robust and may be handled just like similar cables using conventional conductors.

Finally, a test of the electrical properties of the connectorized cables was carried out by creating an electrical loop circuit of superconducting cable. The circuit went into and out of the cryostat through standard coaxial cables, but, in the coldest stage, the two superconducting cables under test were joined together to send the signal back up another leg of standard cable out of the cryostat. All cables and connectors had a nominal characteristic impedance of 50Ω A~700 ps full width at half maximum (FWHM) pulse—representative of signals in our SNSPD application— was sent into the loop and recorded on an oscilloscope the transmitted and reflected signals.

The latter was extracted by using an RF circulator on the incident leg of the loop before it entered the cryostat, which would redirect any reflections coming back out of the chamber into the oscilloscope. By looking at the time dependence of the reflected signal, different reflections were assigned to particular segments of the loop. The results are shown in FIG. 2. In effect, the loop, including the superconducting cables at the link, faithfully transmitted the incident signal. The reflection coefficient from the superconducting segment was <1%, corresponding to a reflection loss of better than −40 dB. Indeed, the connectorized superconducting cable was better impedance matched than other parts of the loop. Specifically, the first peak in the reflection curve of FIG. 2 is from a standard 50 Ω SMA vacuum feedthrough and is three times as large as the reflections from the connectorized cables.

In conclusion, a procedure for connectorizing superconducting cables is described herein. The mechanical and electrical integrity of the joints has also been demonstrated. While direct experience is with SMA connectors, this method can be readily adaptable to connecting any type of RF connector to a superconducting cable. Finally, the copper on NbTi electroplating recipe detailed herein may have uses beyond attaching RF connectors to superconducting cables. For example, this disclosure contemplates that the process described in FIG. 3 can be used to electroplate a layer of metal on the surface of another metal that oxidizes when exposed to air (e.g., magnesium or aluminum). For example, the method can include depositing an oxide layer on a surface of a first metal using a first electrolytic cell (e.g., using step 302 of FIG. 3); and depositing a layer of a second metal on the surface of the first metal using a second electrolytic cell (e.g., using step 302 of FIG. 3). The oxide layer allows the layer of the second metal to adhere to the surface of the first metal References

[1] *Technical Instruction: RDK101D 4K Cold Head* (Sumitomo Heavy Industries, Sheffield, England, 2016).

[2] S. T. Chase, Single-stage Sub-kelvin [3]He Cooler Installation and *Operating Instructions* (Chase Research Cryogenics, 2015).

[3] K. Uhlig, Cryogenics 42, 73 (2002).

[4] N. W. Ashcroft and N. D. Mermin, *Solid State Physics* (Holt, Rinehart, and Winston, New York, 1976).

[5] Abrikosov, *Fundamentals of the Theory of Metals* (U.S. Department of Defense, Amsterdam, 1988) pp. 8-26.

[6] J. Olson, Cryogenics 33, 729 (1993).

[7] COAX Japan, LTD., 2-31 Misuzugaoka, Aoba-ku, Yokohama-shi, Kanagawa 225-0016 Japan.

[8] J. C. Brunet, A. Jacquemod, A. Chatelain, and I. Monteiro, in *Proceedings of the 18th International Cryogenic Engineering Conference*, edited by K. G. Narayan-Khedkar (ICEC Office, Mumbai, 2000) pp. 107-110.

[9] E. B. Saubestre and E. P. Bulan, "Electroplating of niobium," (1961), U.S. Pat. No. 2,999,799.

[10] W. E. Hanford and R. M. Joyce, Journal of the American Chemical Society 68, 2082 (1946).

[11] ASM International Handbook Committee, *ASM Handbook, Volume 05-Surface Engineering* (ASM International, Metals Park, Ohio, 1994) pp. 845-846.

[12] P. Steffan, personal communication (2017).

[13] E. Gaul, Journal of Chemical Education 70, 176 (1993).

[14] Digi-Key SMA connector, p/n J487-ND onto SC-219/50-NbTi-NbTi cable from COAX Japan, LTD.

[15] U.S. Department of Defense, *MIL-PRF-39012E, Connectors, Coaxial, Radio Frequency, General Specification for* (U.S. Department of Defense, Philadelphia, 2005) pp. 8-26.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for connectorizing a superconducting cable, comprising:
    depositing an oxide layer on a surface of a superconducting cable, wherein the oxide layer is deposited on the surface of the superconducting cable using a first electrolytic cell;
    electroplating a metal layer on the oxide layer of the superconducting cable, wherein the oxide layer allows the metal layer to adhere to the surface of the superconducting cable, and wherein electroplating the metal layer comprises depositing the metal layer on the surface of the superconducting cable using a second electrolytic cell; and
    soldering a connector to the metal layer coated on the surface of the superconducting cable.

2. The method of claim 1, wherein the oxide layer has a thickness greater than or equal to 10 nanometers (nm).

3. The method of claim 2, wherein the oxide layer has a thickness of less than 35 nm.

4. The method of claim 1, wherein the metal layer is made of a non-magnetic metal.

5. The method of claim 1, wherein the metal layer is made of at least one of copper, silver, gold, or alloys thereof.

6. The method of claim 1, wherein the first electrolytic cell includes an oxidizing solution.

7. The method of claim 6, wherein the oxidizing solution comprises sodium hydroxide (NaOH) in deionized water.

8. The method of claim 1, wherein depositing an oxide layer on the surface of the superconducting cable comprises:
    placing the surface of the superconducting cable into the first electrolytic cell; and
    applying a first electrical signal to a circuit comprising a cathode and an anode, wherein the anode is the surface of the superconducting cable.

9. The method of claim 8, wherein the first electrical signal has a voltage between 5V and 15V.

10. The method of claim 1, wherein the metal layer is made of copper, and wherein the second electrolytic cell includes an acidic copper plating solution.

11. The method of claim 10, wherein the acidic copper plating solution comprises copper sulfate pentahydrate ($CuSO_4 \cdot 5H_2O$) with sulfuric acid ($H_2SO_4$) in deionized water.

12. The method of claim 1, wherein depositing the metal layer on the surface of the superconducting cable using a second electrolytic cell comprises:
    placing the surface of the superconducting cable into the second electrolytic cell; and
    applying a second electrical signal to a circuit comprising a cathode and an anode, wherein the cathode is the surface of the superconducting cable.

13. The method of claim 12, wherein the second electrical signal delivers current per area between 5 mA/cm$^2$ and 60 mA/cm$^2$.

14. The method of claim 1, wherein the superconducting cable is made of niobium-titanium (NbTi).

15. The method of claim 1, wherein the superconducting cable is made of niobium, titanium, or alloys thereof.

16. The method of claim 1, wherein the connector is a radiofrequency (RF) connector.

* * * * *